(12) United States Patent
Pfeiffer et al.

(10) Patent No.: US 12,359,959 B2
(45) Date of Patent: Jul. 15, 2025

(54) SENSOR APPARATUS FOR CAPTURING A FILLING LEVEL AND/OR A QUALITY OF A FLUID, AND METHOD FOR PRODUCING SAID APPARATUS

(71) Applicant: Vitesco Technologies Germany GmbH, Hannover (DE)

(72) Inventors: Karl-Friedrich Pfeiffer, Munich (DE); Henning Grotevent, Munich (DE); Manfred Roth, Munich (DE)

(73) Assignee: VITESCO TECHNOLOGIES GERMANY GMBH, Regensburg (DE)

( * ) Notice: Subject to any disclaimer, the term of this patent is extended or adjusted under 35 U.S.C. 154(b) by 285 days.

(21) Appl. No.: 17/793,750

(22) PCT Filed: Dec. 7, 2020

(86) PCT No.: PCT/EP2020/084845
§ 371 (c)(1),
(2) Date: Jul. 19, 2022

(87) PCT Pub. No.: WO2021/148181
PCT Pub. Date: Jul. 29, 2021

(65) Prior Publication Data
US 2023/0076911 A1    Mar. 9, 2023

(30) Foreign Application Priority Data
Jan. 23, 2020 (DE) ............. 10 2020 200 771.3

(51) Int. Cl.
*G01F 23/296* (2022.01)
(52) U.S. Cl.
CPC .............. *G01F 23/2968* (2013.01)

(58) Field of Classification Search
CPC ................................. G01F 23/2968
(Continued)

(56) References Cited

U.S. PATENT DOCUMENTS

| 7,471,034 B2 | 12/2008 | Schlote-Holubek ... H04R 25/00 |
| 10,433,063 B2 | 10/2019 | Beltrami ............ H04R 7/10 |

(Continued)

FOREIGN PATENT DOCUMENTS

| CN | 105596027 | 5/2016 | ............ A61B 8/00 |
| CN | 107271001 A | 10/2017 | ........... G01F 23/296 |

(Continued)

OTHER PUBLICATIONS

Search Report for International Application No. PCT/EP2020/084845, 12 pages, Mar. 15, 2021.

(Continued)

*Primary Examiner* — Peter J Macchiarolo
*Assistant Examiner* — Rodney T Frank
(74) *Attorney, Agent, or Firm* — Slayden Grubert Beard PLLC

(57) ABSTRACT

Various embodiments of the teachings herein include a fluid sensor apparatus for capturing a filling level and/or a quality of a fluid in a fluid container. The fluid sensor apparatus may include: a printed circuit board having a recess extending at least partially into the printed circuit board along a thickness and a fastening area; an ultrasonic transducer fitted to the fastening area so the ultrasonic transducer extends at least partially over the recess; and a housing at least partially surrounding the printed circuit board and the ultrasonic transducer so a portion of the housing area is arranged in the recess.

15 Claims, 5 Drawing Sheets

(58) Field of Classification Search
USPC .................................................. 73/290 V
See application file for complete search history.

(56) References Cited

U.S. PATENT DOCUMENTS

| | | | |
|---|---|---|---|
| 2002/0012015 A1 | 1/2002 | Tsukada | ............................ 347/7 |
| 2010/0095750 A1 | 4/2010 | Oita | ............................ 73/64.53 |
| 2014/0157902 A1 | 6/2014 | Sugiura | ............................ 73/627 |
| 2017/0157647 A1* | 6/2017 | Kojima | ............... G01S 15/8925 |
| 2017/0284850 A1 | 10/2017 | Fedgenhaeuer et al. | |
| 2018/0156651 A1 | 6/2018 | Schulz et al. | |
| 2018/0328768 A1 | 11/2018 | Huijzer et al. | |
| 2019/0113379 A1 | 4/2019 | Roth | |
| 2019/0291136 A1 | 9/2019 | Joyce | ........................ B06B 1/06 |

FOREIGN PATENT DOCUMENTS

| | | | | |
|---|---|---|---|---|
| CN | 108168632 A | 6/2018 | ............... | G01F 1/66 |
| CN | 108871476 A | 11/2018 | ............... | G01F 1/66 |
| CN | 209296914 | 8/2019 | ............. | G01S 7/521 |
| DE | 101 30 540 | 1/2003 | ........... | G01F 23/296 |
| DE | 10 2005 012 566 | 9/2006 | ........... | G01F 23/296 |
| DE | 10 2016 205 240 | 7/2017 | ........... | G01F 23/296 |
| DE | 102017209471 A1 | 6/2018 | ........... | G01F 23/296 |
| EP | 2 236 993 | 10/2010 | ............... | G01F 1/66 |
| JP | 2010 164331 | 7/2010 | ............. | G01S 7/521 |

OTHER PUBLICATIONS

Office Action for DE Application No. 10 2020 200 771.3, 5 pages, Nov. 9, 2020.

Chinese Office Action, Application No. 202080094038.3, 12 pages, Feb. 19, 2025.

* cited by examiner

SENSOR APPARATUS FOR CAPTURING A FILLING LEVEL AND/OR A QUALITY OF A FLUID, AND METHOD FOR PRODUCING SAID APPARATUS

CROSS-REFERENCE TO RELATED APPLICATIONS

This application is a U.S. National Stage Application of International Application No. PCT/EP2020/084845 filed Dec. 7, 2020, which designates the United States of America, and claims priority to DE Application No. 10 2020 200 771.3 filed Jan. 23, 2020, the contents of which are hereby incorporated by reference in their entirety.

TECHNICAL FIELD

The present disclosure relates to sensors. Various embodiments may include fluid sensor apparatuses for capturing the filling level and/or quality of a fluid and/or methods for producing said apparatus.

BACKGROUND

An acoustic measuring apparatus, for example, can be used to determine a level of a fluid surface in a fluid container. A sound transducer of the acoustic measuring apparatus can operate both as a sound generator and as a sound receiver. In order to determine the level of the fluid surface in the fluid container, the sound transducer can be used to emit sound pulses or sound signals into the fluid to be measured. The sound pulses or sound signals can be reflected by a surface or boundary surface of the fluid to a further medium. From the propagation time of the sound pulses or sound signals, conclusions can be drawn about the level of the fluid surface in the fluid container and thus the filling level of the fluid can be determined. The frequencies of the sound signals are typically in the ultrasonic range.

It is known practice to manufacture fluid sensor apparatuses as compact electronic structural units. For this purpose, for example, a printed circuit board can be equipped with all electronic components, in particular also at least one ultrasonic transducer, which in turn is then completely encapsulated with a plastic to form a housing for the electronics and to protect the electronic components from environmental influences such as moisture. In this case, it is typical to solder the entire surface of the ultrasonic transducer to the surface of the printed circuit board and thereby to connect it electrically to the conductor tracks on the printed circuit board.

DE 10 2016 205 240 B3 discloses a method for producing an ultrasonic sensor and an ultrasonic sensor that is designed to capture the filling level and/or the temperature of a fluid in an internal combustion engine. The method disclosed therein comprises providing electronics of the ultrasonic sensor, arranging the electronics of the ultrasonic sensor in an injection mold, and encapsulating the electronics with plastic to form a housing for the electronics. The housing comprises at least one functional section which is designed to fulfill a predetermined function. Further ultrasonic sensor apparatuses are known from CN 105 596 027 A, U.S. Pat. No. 7,471,034 B2, CN 209 296 914 U and U.S. Pat. No. 10,433,063 B2.

The full-surface soldering of the ultrasonic sensor from the printed circuit board can lead to air pockets or defects forming in the soldering layer between the ultrasonic transducer and the printed circuit board, even if the soldering process is carried out as a vacuum soldering process. These air pockets or defects are very disruptive to the acoustic properties of the sound transducer, since they can represent random disruptions in the vibration, emission, and decay behavior of the sound transducer. In addition, the sound transducer can tend to float on the soldering material and move laterally in an undefined manner during the soldering process, which can limit the accuracy with which the sound transducer is positioned on the printed circuit board and thus the measurement accuracy of the entire fluid sensor apparatus. If a grid of smaller individual points is selected instead of areally applying the soldering material, this effect can tend to occur even more. Another negative effect is that fluctuations in the thickness of the printed circuit boards can lead to different acoustic behavior of the sound transducer. If the sound transducer is fastened to the printed circuit board with a (preferably conductive) adhesive instead of solder, similar problems with defects or air pockets occur.

SUMMARY

The present disclosure describes fluid sensor apparatuses and methods for producing said apparatus, with which it is possible to exactly position the sound transducer on the printed circuit board and the measurement accuracy of the fluid sensor apparatus is substantially improved. For example, some embodiments include a fluid sensor apparatus (100) for capturing a filling level (10) and/or a quality of a fluid (12) in a fluid container (14), wherein the fluid sensor apparatus (100) has: a printed circuit board (120) having at least one recess (130) which extends at least partially into the printed circuit board (120) in the direction of its thickness, wherein the printed circuit board (120) has at least one fastening area (122, 124, 126, 128), an ultrasonic transducer (110) which is fitted to the at least one fastening area (122, 124, 126, 128) of the printed circuit board (120) in such a way that the ultrasonic transducer (110) extends at least partially over the recess (130), and a housing (140) which at least partially surrounds the printed circuit board (120) and the ultrasonic transducer (110) in such a way that a housing area (142) is at least partially arranged in the recess (130).

In some embodiments, the recess (130) extends completely through the printed circuit board (120) in the direction of its thickness.

In some embodiments, the housing area (142) arranged in the recess (130) has a concave section (143) on the side facing away from the ultrasonic transducer (110), which concave section is designed to at least partially deflect the ultrasonic signals emitted by the ultrasonic transducer (100) away from the ultrasonic transducer (110), or reflect them back to the ultrasonic transducer (110) in a defined manner, or transmit them into the environment.

In some embodiments, the recess (130) is formed from at least one bore (132, 134, 136, 138, 144).

In some embodiments, the recess (130) is formed from four bores (132, 134, 136, 138) with parallel bore axes (133, 135, 137, 135), wherein the bore axes (133, 135, 137, 135) of three of the bores (134, 136, 138) are arranged relative to the bore axis (133) of the other bore (132) in such a way that they are at the corners of a triangle (131) in a plane perpendicular to the bore axes (133, 135, 137, 139) and the bores (132, 134, 136, 138) at least partially overlap.

In some embodiments, the four bores (132, 134, 136, 138) each have the same bore diameter and the distance between the bore axes (135, 137, 139) of the three bores (134, 136, 138) and the bore axis (133) of the central bore (132) corresponds to approximately 0.2 to 0.9 times the bore diameter.

In some embodiments, the recess (130) is formed from five bores (132, 134, 136, 138, 144) with parallel bore axes (133, 135, 137, 139, 145), wherein the bore axes (135, 137, 139, 145) of four of the bores (134, 136, 138, 144) are arranged symmetrically relative to the bore axis (133) of the other bore (132) in such a way that they are at the corners of a quadrilateral (141) in a plane perpendicular to the bore axes (133, 135, 137, 139, 145) and the bores (132, 134, 136, 138, 144) at least partially overlap.

In some embodiments, the five bores (132, 134, 136, 138, 144) each have the same bore diameter and the distance between the bore axes (135, 137, 139, 145) of the four bores (134, 136, 138, 144) and the bore axis (133) of the central bore (132) corresponds to approximately 0.2 to 0.9 times the bore diameter.

In some embodiments, the recess (130) is at least partially formed by milling.

In some embodiments, the recess (130) is formed by three straight millings (132, 134, 136) extending symmetrically to each other from a common point (133) at an angle of approximately 120°.

In some embodiments, the recess is a cruciform recess (130).

As another example, some embodiments include a method for producing a fluid sensor apparatus (100) which is designed to capture a filling level (10) and/or a quality of a fluid (12) in a fluid container (14), wherein the method comprises: providing a printed circuit board (120), producing at least one recess (130) in the printed circuit board (120), which extends at least partially into the printed circuit board (120) in the direction of its thickness, fitting at least one ultrasonic transducer (110) to the printed circuit board (120) in such a way that the ultrasonic transducer (110) extends at least partially over the recess (130), and encapsulating at least partially the printed circuit board (120) and the ultrasonic transducer (110) with plastic to form a housing (140) such that it is at least partially arranged in the recess (130).

In some embodiments, the recess (130) extends completely through the printed circuit board (120) in the direction of its thickness.

In some embodiments, the recess (130) is produced from at least one bore (132, 134, 136, 138, 144) and/or at least one milling (132, 134, 136).

In some embodiments, the process of fitting the at least one ultrasonic transducer (110) to the printed circuit board (120) comprises: positioning the ultrasonic transducer (110) on the printed circuit board (120) at a predetermined position, fixing the ultrasonic transducer (110) at the predetermined position by means of a positioning device, and fastening and electrically connecting the ultrasonic transducer (110) to the printed circuit board (120).

BRIEF DESCRIPTION OF THE DRAWINGS

Further objects and features of the teachings of the present disclosure will become apparent to a person skilled in the art by putting the present teaching into practice and taking into consideration the accompanying drawings, in which.

DETAILED DESCRIPTION

Figure 1:
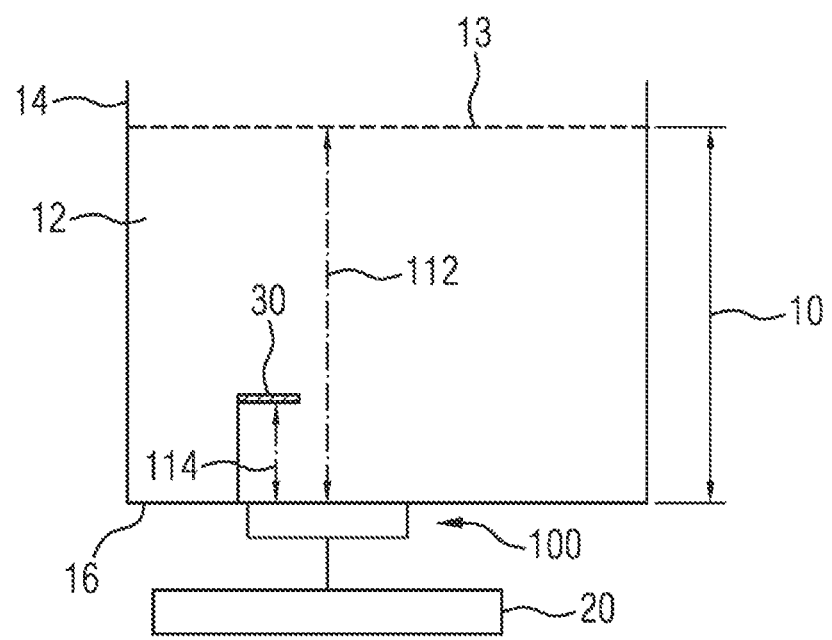
FIG. 1 shows a schematic view of a fluid sensor apparatus for determining the filling level and/or the quality of a fluid in a fluid container incorporating teachings of the present disclosure.

The present disclosure includes teachings related to manufacturing sensor apparatuses including structuring or completely breaking through the printed circuit board of the fluid sensor apparatus in the area of the ultrasonic transducer, so that the ultrasonic transducer is almost completely enclosed during the embedding process, for example by means of plastic pressing or plastic injection molding, and the acoustic properties are not adversely affected by a solder or adhesive layer between the sound transducer and the printed circuit board. In addition, the measurement accuracy can be improved by providing only a few soldering points, since floating of the ultrasonic transducer on the solder layer can be at least partially reduced and the surface tension of the solder can hold the ultrasonic transducer at the desired position. There are similar advantages with (preferably conductive) adhesive bonding of the ultrasonic transducer to a few fastening points.

In some embodiments, a fluid sensor apparatus for capturing a filling level and/or a quality of a fluid in a fluid container has a printed circuit board having at least one recess which extends at least partially into the printed circuit board in the direction of its thickness. The printed circuit board comprises at least one fastening area which is preferably arranged in the immediate vicinity of or adjacent to the recess. The fluid sensor apparatus according to the invention also has an ultrasonic transducer which is fitted to the at least one fastening area of the printed circuit board in such a way that the ultrasonic transducer extends at least partially over the recess, and a housing which at least partially surrounds the printed circuit board and the ultrasonic transducer in such a way that a housing area is at least partially arranged in the recess.

Due to the fact that the ultrasonic transducer is only connected to the printed circuit board via the (relatively small) fastening area and a housing area is at least partially arranged in the recess, the aspects already identified above as disadvantages can be at least partially overcome. In particular, the air pockets or defects produced during a soldering or adhesive bonding process can be almost completely avoided by completely fitting the housing to the ultrasonic sensor. In addition, better damping of the decay time of the ultrasonic transducer can be achieved and less scattering of the properties of different fluid sensor apparatuses can be achieved. In addition, the ultrasonic transducer can be positioned better during the soldering or adhesive bonding process, since the ultrasonic transducer is only fastened to the printed circuit board via the fastening area that is at least small in terms of surface area and no longer, as was known from the prior art, over the entire surface of the printed circuit board.

In some embodiments, the recess extends completely through the printed circuit board in the direction of its thickness.

In some embodiments, the housing area arranged in the recess has a concave section on the side facing away from the ultrasonic transducer, which concave section is designed to at least partially deflect the ultrasonic signals emitted by the ultrasonic transducer away from the ultrasonic transducer or to reflect them back to the ultrasonic transducer in a defined manner or to transmit them into the environment.

In the case of a completely perforated printed circuit board, the rear side of the housing or of the housing area of the housing in the recess can thus be structured in such a way that the acoustic properties of the ultrasonic transducer are improved in a targeted manner. For example, a conical concave area can be introduced at this point, which also extends at least partially into the recess and is designed to deflect the ultrasonic signals emitted by the ultrasonic transducer in such a way that they are no longer reflected back to the ultrasonic transducer as interference signals.

The recess may be formed from at least one bore. It may be preferred in this case to form the recess from four bores with parallel bore axes, wherein the bore axes of three of the bores are arranged symmetrically relative to the bore axis of the other bores in such a way that they are at the corners of a triangle, e.g. an equilateral triangle, in a plane perpendicular to the bore axes and the bores at least partially overlap and thus form an uninterrupted recess.

Such a symmetrically shaped recess makes it possible to obtain three distributed fastening areas which are arranged in a manner symmetrically distributed relative to the central bore. This symmetry can lead to the positive effect that, when the ultrasonic transducer is soldered to the printed circuit board, the surface tension of the soldering material can lead to good positioning of the ultrasonic transducer. In addition, it is desirable to keep a sufficiently large area free underneath the ultrasonic transducer so that sufficient housing material can be arranged underneath the ultrasonic transducer and within the recess.

In some embodiments, the four bores each have the same bore diameter and the distance between the bore axes of the three outer bores and the bore axis of the central bore corresponds to approximately 0.2 to 0.9 times the bore diameter. It can thus be ensured that the symmetrical arrangement of the bore axes relative to one another can lead to a sufficiently large overlap and an uninterrupted recess can be obtained. In some embodiments, the bores have different bore diameters. These configurations therefore have in common an at least partial overlap between the bores and the resulting continuous and uninterrupted recess.

In some embodiments, the recess is formed from five bores with substantially parallel bore axes, wherein the bore axes of four of the bores are arranged relative to the bore axis of the other bore in such a way that they are at the corners of a quadrilateral, a rectangle, and/or a square, in a plane perpendicular to the bore axes and the bores at least partially overlap.

In some embodiments, the five bores each have the same bore diameter and the distance between the bore axes of the four outer bores and the bore axis of the central bore corresponds to approximately 0.2 to 0.9 times the bore diameter. In some embodiments, the bores have different bore diameters.

In some embodiments, the recess is at least partially formed by millings. In some embodiments, the recess is formed by three straight millings extending symmetrically to each other from a common point at an angle of approximately 120°.

In some embodiments, the recess is a cruciform recess. This means that the recess consists of two straight millings that intersect at or near the center. In some embodiments, the two straight millings are substantially perpendicular to one another and form a symmetrical cross.

In some embodiments, a method for producing a fluid sensor apparatus designed to capture a filling level and/or quality of a fluid in a fluid container comprises providing a printed circuit board having a recess that extends at least partially into the printed circuit board in the direction of its thickness, fitting at least one ultrasonic transducer to the printed circuit board in such a way that the ultrasonic transducer extends at least partially over the recess, and encapsulating at least partially the printed circuit board and the ultrasonic transducer with plastic to form a housing such that it is at least partially arranged in the recess.

In some embodiments, the recess extends completely through the printed circuit board in the direction of its thickness.

In some embodiments, the recess is formed from at least one bore and/or at least one milling.

In some embodiments, the process of fitting the at least one ultrasonic transducer to the printed circuit board comprises positioning the ultrasonic transducer on the printed circuit board at a predetermined position, fixing the ultrasonic transducer at the predetermined position using a positioning device, and fastening and electrically connecting the ultrasonic transducer to the printed circuit board. The positioning device can be a template or a clamp.

Elements of the same design or function are provided with the same reference signs throughout the figures.

Within the scope of the present disclosure, the term "fluid quality" describes a parameter characterizing a fluid. For example, the sound speed of the fluid, the density of the fluid, from which the chemical composition of the fluid can be derived, the electrical properties of the fluid and the damping properties of the fluid can be interpreted as parameters which characterize the fluid quality. For example, in the case of an aqueous urea solution, for example urea, the proportion of urea in the water can be estimated by determining the temperature-dependent sound speed of the aqueous urea solution.

A fluid sensor apparatus 100, which is arranged on the base section 16 of the fluid container 14, is provided for the purpose of determining a filling level 10 of a fluid 12 in a fluid container 14. In particular, as illustrated in FIG. 1, the fluid sensor apparatus 100 can be fitted to the fluid container 14 from the outside in such a way that the ultrasonic signals emitted by the fluid sensor apparatus 100 are coupled into the fluid 12 through the wall of the base section 16. In some embodiments, it is also possible to provide an opening in the base section 16 of the fluid container 14, which opening is sealed in a media-tight manner by the fluid sensor apparatus 100 fitted to the base section 16 from the outside in such a way that the ultrasonic signals emitted by the fluid sensor apparatus 100 can be directly coupled into the fluid 12.

For example, the housing wall of the fluid container 14 is formed from a plastic, such as so-called high-density polyethylene (HDPE). The fluid sensor apparatus 100 can be adhesively bonded to the housing wall of the fluid container 14 or mechanically pressed against it, possibly also with a further intermediate layer in order to compensate for unevennesses or roughnesses.

A control unit 20 is connected to the fluid sensor apparatus 100 and is designed to actuate the fluid sensor apparatus 100 to emit sound signals and to evaluate the signals received from the fluid sensor apparatus 100 in order to determine the filling level and/or the quality of the fluid 12.

In this case, the filling level 10 of the fluid 12 is defined as the distance between the fluid surface 13 and the base section 3, measured in a neutral position of the fluid container 14, that is to say if there is no inclined position of the fluid container 14 and the fluid surface 13 is substantially parallel to the base section 16.

Figure 2:
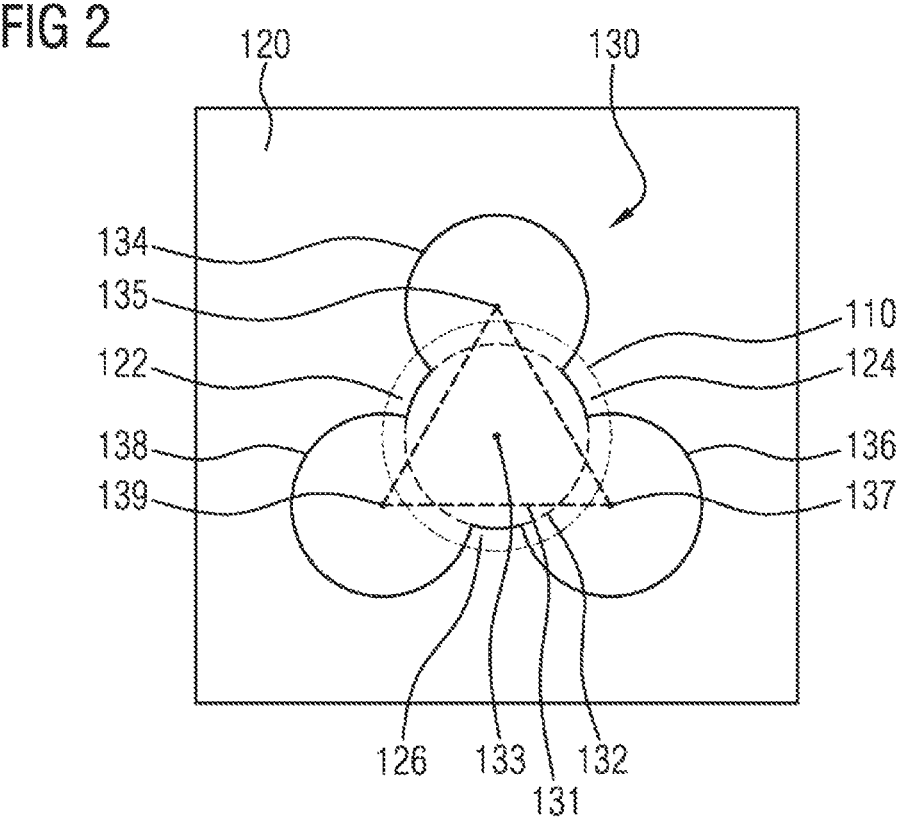
FIG. 2 shows a schematic plan view of a first embodiment of a printed circuit board of the fluid sensor apparatus illustrated in FIG. 1.

With additional reference to FIG. 2, the fluid sensor apparatus 100 comprises at least one ultrasonic transducer 110 (see, for example, FIG. 2) which is arranged on a printed circuit board 120 and is designed to emit and receive ultrasonic signals. The ultrasonic transducer 110 can be designed by means of different actuation to emit an ultrasonic signal at different sound frequencies into the fluid 12 and to receive it again as a reflection signal. For example, the sound signals emitted and received again by the ultrasonic transducer 110 for capturing the filling level 10 are marked with the arrow 112 in FIG. 1.

At least one reference element 30 (see FIG. 1) is also provided in the fluid 12 and may be formed from a material having a metal. The reference element 30, which is of course optional, is arranged at a predetermined, constant distance from a further ultrasonic transducer (not explicitly shown) arranged on the printed circuit board 120 and is designed to reflect at least part of the ultrasonic signal represented by an arrow 114. As shown in FIG. 1, the reference element 30 inside the fluid container 14 is mechanically coupled to the base section 16. At this point, it should be noted that only the ultrasonic transducer 110 may be present, which emits ultrasonic signals both to the surface 13 and to the reference element 30.

The filling level 10 and/or the quality of the fluid 12 is/are determined, as described in detail in the prior art, by evaluating the ultrasonic signal 112 which is emitted by the ultrasonic transducer 110 to the fluid surface 13, is reflected at the fluid surface 13 and is received again, and by evaluating the ultrasonic signal 114 which is emitted by another ultrasonic transducer to the reference element 30, is reflected at the reference element 30 and is received again and on the basis of which the quality of the fluid 12, such as the sound speed in the fluid 12, can be determined. In some embodiments, the filling level and the quality can be determined on the basis of the ultrasonic signals emitted by a single ultrasonic transducer 110 which is provided and emits them both to the surface 13 and to the reference element 30.

As already mentioned, the fluid sensor apparatus 100 has the printed circuit board 120, the at least one ultrasonic transducer 110 arranged thereon and an optional further ultrasonic transducer. However, the printed circuit board 120 may contain other electronic elements, such as capacitors, resistors, operational amplifiers or an application-specific integrated circuit (ASIC), that are required for proper operation of the fluid sensor apparatus 100.

FIG. 2 shows a schematic plan view of the printed circuit board 120 of the fluid sensor apparatus 100. The printed circuit board 120 has a recess 130 which is formed from a total of four bores 132, 134, 136, 138 in the embodiment in FIG. 2. The bores 132, 134, 136, 138 may be through-bores and extend completely through the printed circuit board 120 in the thickness direction. In some embodiments, the four bores 132, 134, 136, 138 may be in the form of blind bores. It is also possible for bores 132, 134, 136, 138 to be in the form of through-bores and for other bores 132, 134, 136, 138 to be in the form of blind bores. In some embodiments, the central bore 132 may be a through-bore, with the other bores 134, 136, 138 being in the form of blind bores.

The respective bore axes 133, 135, 137, 139 of the bores 132, 134, 136, 138 extend substantially parallel to one another and are arranged symmetrically to one another in such a way that the bore axes 135, 137, 139 are arranged symmetrically about the central bore axis 133. In particular, the bore axes 135, 137, 139 are at the corners of a virtual equilateral triangle 131 which extends substantially perpendicular to the bore axes 133, 135, 137, 139. In some embodiments, the bore axes 135, 137, 139 are at the corners of any virtual triangle 131 which does not necessarily have to be equilateral and therefore the bore axes 135, 137, 139 do not necessarily have to be arranged symmetrically about the central bore axis 133.

In the configuration in FIG. 2, the printed circuit board 120 has a total of three fastening areas 122, 124, 126, to which an ultrasonic transducer 110, illustrated schematically in FIG. 2 with a dotted line, can be fastened. The fastening areas 122, 124, 126 may be arranged in the immediate vicinity of or adjacent to the recess 130, e.g. at the central bore 132. The ultrasonic transducer 110 is fitted to the printed circuit board 120 by means of the fastening areas 122, 124, 126 in such a way that the ultrasonic transducer 110 extends at least partially over the recess 130. This means that the ultrasonic transducer 110 is fitted at least partially above the recess 130 and the recess 130 is dimensioned such that there is a sufficiently large area of the recess in the radial direction outside of the ultrasonic transducer 110 (viewed in plan view), in which a housing 140 (see FIGS. 6 to 8) can be provided in such a way that a housing area 142 (see also FIGS. 6 to 8) is at least partially arranged in the recess 130.

The recess 130 in the printed circuit board 120 may be configured in such a way that the ultrasonic transducer 110 can be fastened to the printed circuit board 120 and electrically connected to it in such a way that the overlap of the ultrasonic transducer 110 with the recess 120 is significantly larger than the overlap of the ultrasonic transducer 110 with the printed circuit board 120. In addition, it is preferred that the housing almost completely encloses the ultrasonic transducer and is in contact with it almost over its entire surface.

Figure 3:
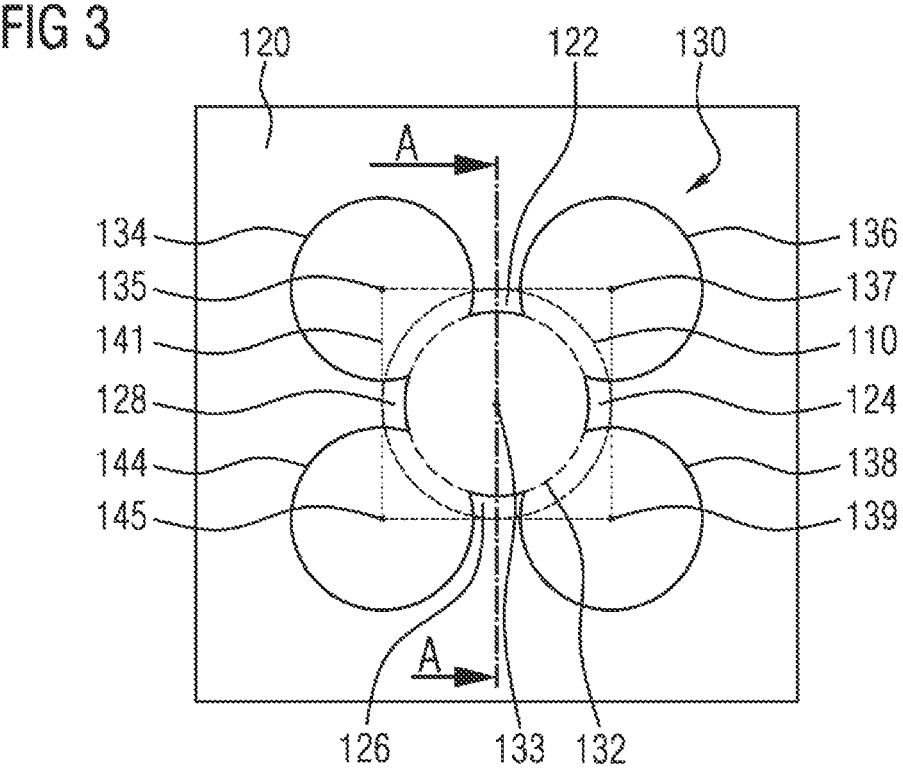
FIG. 3 shows a schematic plan view of a further embodiment of the printed circuit board of the fluid sensor apparatus illustrated in FIG. 1.

FIG. 3 shows a further possible embodiment for the shape of the recess 130. According to FIG. 3, the recess 130 is formed by a total of five bores 132, 134, 136, 138, 144, the bore axes 133, 135, 137, 139, 145 of which extend substantially parallel to one another. The bores 132, 134, 126, 138, 144 are arranged such that they at least partially overlap to form an uninterrupted recess 130. As shown in FIG. 3, the bore axes 135, 137, 139, 145 are arranged symmetrically about the bore axis 133 in such a way that these bore axes 135, 137, 139, 145 are at the corners of a virtual square 141. In a similar manner to FIG. 2, it is also alternatively possible here for the bore axes 135, 137, 139, 145 to be arranged on the corners of a quadrilateral, e.g. a rectangle.

The ultrasonic transducer 110 according to FIG. 3 can again be fastened to the printed circuit board 120 via a total of four fastening areas 122, 124, 126, 128 which are preferably arranged in the immediate vicinity of or adjacent to the recess, preferably the central bore 132. Here, too, the ultrasonic transducer 110 is again fitted to the fastening areas 122, 124, 126, 128 on the printed circuit board 120 in such a way that the ultrasonic transducer 110 extends at least partially over the recess 130.

Figure 4:
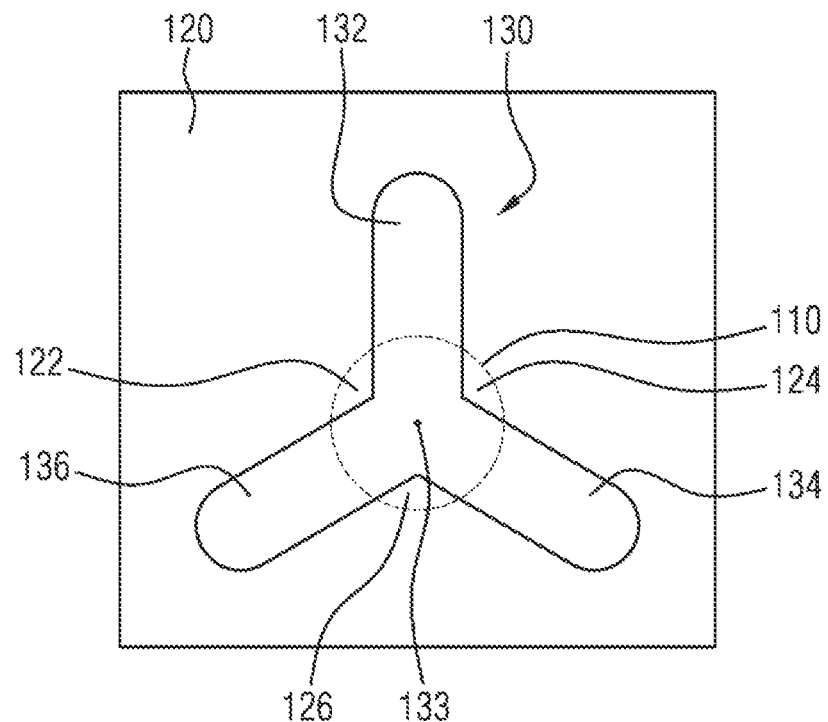
FIG. 4 shows a schematic plan view of a further embodiment of the printed circuit board of the fluid sensor apparatus illustrated in FIG. 1.
Figure 5:
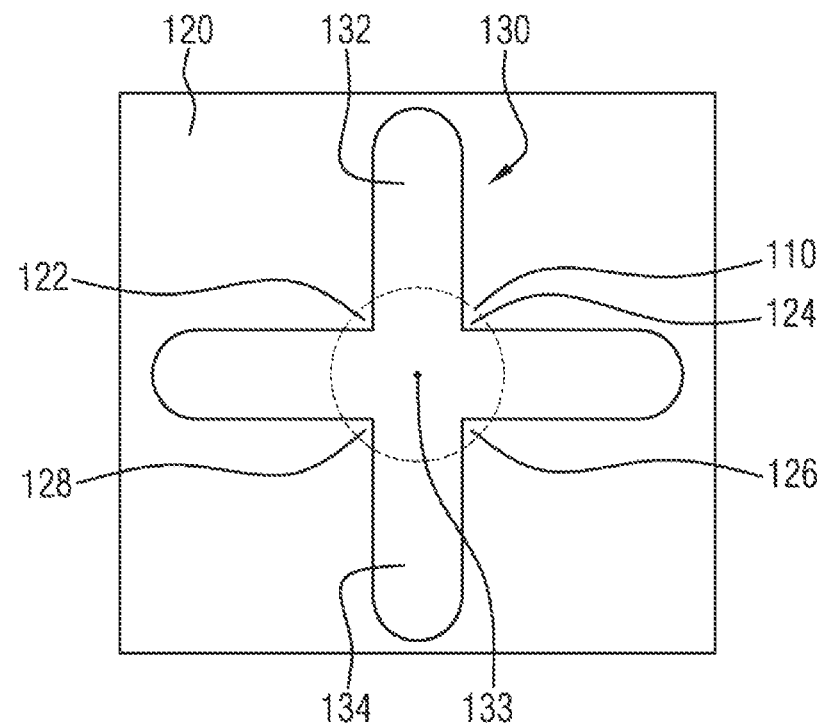
FIG. 5 shows a schematic plan view of a further embodiment of the printed circuit board of the fluid sensor apparatus illustrated in FIG. 1.

FIGS. 4 and 5 show two further possible configurations for the recess 130. The recesses 130 in FIGS. 4 and 5 differ from the recesses 130 in FIGS. 2 and 3 in that they are milled recesses.

The recess 130 in FIG. 4 consists of three straight millings 132, 134, 136 extending symmetrically to each other from a common point 133 at an angle of approximately 120°. In the configuration according to FIG. 4, the ultrasonic transducer 110 can be fitted to the printed circuit board 120 via three fastening areas 122, 124, 126 in such a way that the ultrasonic transducer 110 again extends at least partially over the recess 130, e.g. over the area above the common point 133. The fastening areas 122, 124, 126 are arranged in this case in the immediate vicinity of or adjacent to the recess 130, e.g. the area around the common point 133, and symmetrically thereto.

The recess 130 in FIG. 5 is a cruciform recess. In particular, the recess 130 in FIG. 5 can consist of two straight millings 132, 134 which essentially intersect at a center point 133. The two straight millings 132, 134 are preferably substantially perpendicular to one another. In the embodiment according to FIG. 5, the ultrasonic transducer 110 can be fitted by means of the four fastening areas 122, 124, 128, 126 centrally above the area around the center point 133 in such a way that the ultrasonic transducer 110 again extends at least partially over the recess 130 and is arranged above it.

In some embodiments, the recess 130 can also be designed differently, for example can consist of a combination of bores and millings. In addition, the recess 130 may have any form and is produced using any production method.

Figure 6:
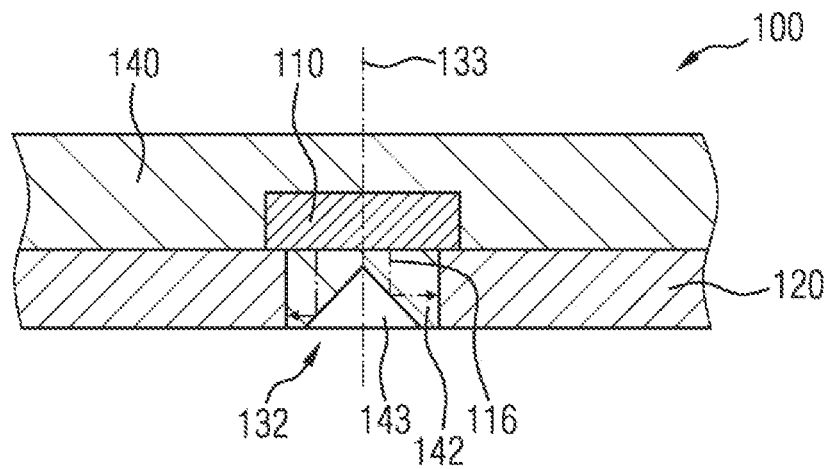
FIG. 6 shows a sectional view through the printed circuit board of a fluid sensor apparatus incorporating teachings of the present disclosure along the line A-A in FIG. 3 with a first configuration option for a housing of the fluid sensor apparatus.
Figure 7:
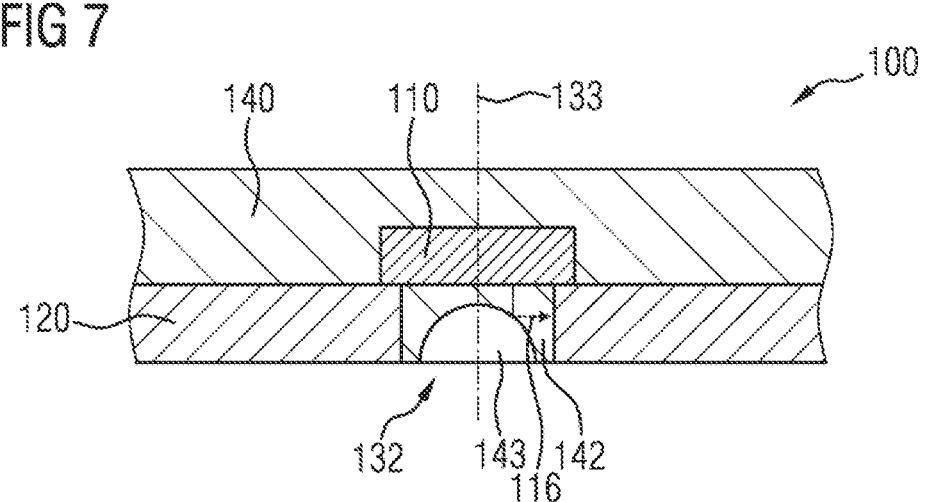
FIG. 7 shows a sectional view through the printed circuit board of a fluid sensor apparatus incorporating teachings of the present disclosure along the line A-A in FIG. 3 with a further configuration option for a housing of the fluid sensor apparatus.
Figure 8:
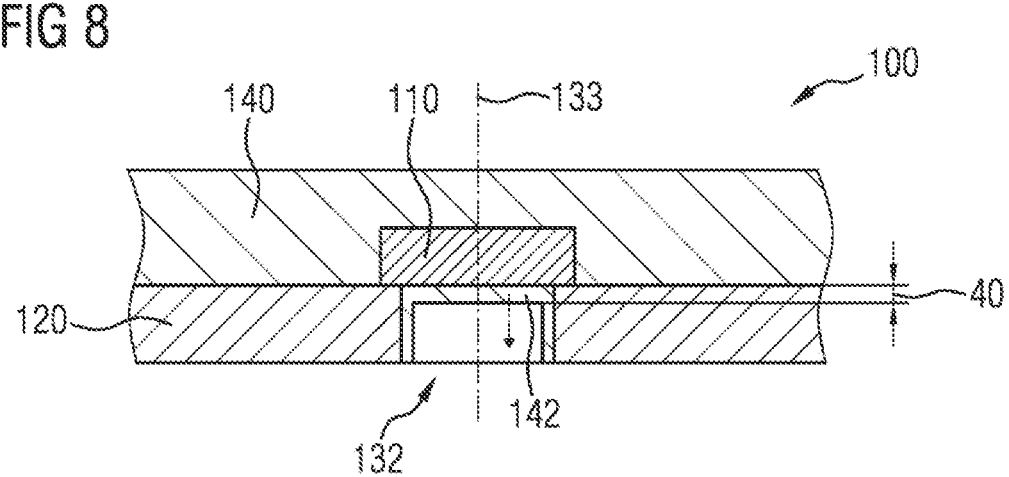
FIG. 8 shows a sectional view through the printed circuit board of a fluid sensor apparatus incorporating teachings of the present disclosure along the line A-A in FIG. 3 with a further configuration option for a housing of the fluid sensor apparatus.

FIGS. 6 to 8 each show sectional views through the printed circuit board 120 of the fluid sensor apparatus 100 along the line A-A in FIG. 3 with different configuration options for the housing 140 of the fluid sensor apparatus 100.

In FIG. 6, the housing 140 surrounds the ultrasonic transducer 110 and at least partially the printed circuit board 120 in such a way that a housing area 142 is at least partially arranged in the recess 130, in particular in the bore 132. This can be produced by means of a plastic injection molding or plastic pressing process, in which case, as already mentioned, the recess 130 is dimensioned such that the plastic can flow over the area of the recess 130 that is not covered by ultrasonic sensor 110, for example over the area of the bores 134, 135, 138 that is not covered by the ultrasonic sensor 110 (see FIG. 2), into the recess 130 in order to at least partially fill it.

In some embodiments, the printed circuit board 120 can also be substantially completely surrounded by the housing 140, so that there is also a substantially closed section of the housing 140 on the side of the printed circuit board 120 facing away from the ultrasonic transducer 110.

The housing area 142 arranged in the recess 130 also has a concave section 143 which is arranged on the side facing away from the ultrasonic transducer 110 and is designed to at least partially deflect the ultrasonic signals emitted by the ultrasonic transducer 110 away from the ultrasonic transducer 110. In FIG. 6, the ultrasonic signal which is deflected by the concave section 143 is marked with a bent arrow 116. The concave section 143 according to the configuration in FIG. 6 is formed in the shape of a cone.

The design of the concave section 143 in FIG. 7 differs from the design of the concave section 143 in FIG. 6 in that a partly spherical, e.g. hemispherical, concave section 143 is provided in the housing area 142 and is designed to again partially guide the ultrasonic signals emitted by the ultrasonic transducer 110 away from the ultrasonic transducer 110. Such a deflected ultrasonic signal is also marked in FIG. 7 with a bent arrow 116.

The concave sections 143 shown in FIGS. 6 to 8 can at least partially prevent the ultrasonic signal, which is emitted downward by the ultrasonic transducer 110 and is not required for the measurement of the fluid sensor apparatus 100, from no longer being reflected back to the ultrasonic transducer 110 and being captured there as an interference signal. In this way, a decay time of the ultrasonic transducer 110 can also be at least partially reduced.

In the configuration according to FIG. 8, the concave section 143 is in the form of a cylindrical section which is shaped in such a way that the housing section 142 has a thickness 40, in the area below the ultrasonic transducer 110, which is dimensioned in such a way that the ultrasonic signals emitted by the ultrasonic transducer 110 are either reflected back to the ultrasonic transducer 110 in a defined manner or can be emitted through it into the environment of the fluid sensor apparatus 100. For example, almost complete transmission through the housing section 142 can be achieved if the thickness 40 of the housing section 142 below the ultrasonic transducer 110 corresponds approximately to an integer multiple of half the wavelength of the ultrasonic signal emitted by the ultrasonic transducer 110. In contrast, almost complete reflection of the ultrasonic signal emitted by the ultrasonic transducer 110 at the boundary surface between the housing section 143 and the environment can be obtained if the thickness 40 is dimensioned in such a way that it corresponds to an odd integer multiple of a quarter of the wavelength of the ultrasonic signal emitted by the ultrasonic transducer 110.

Figure 9:
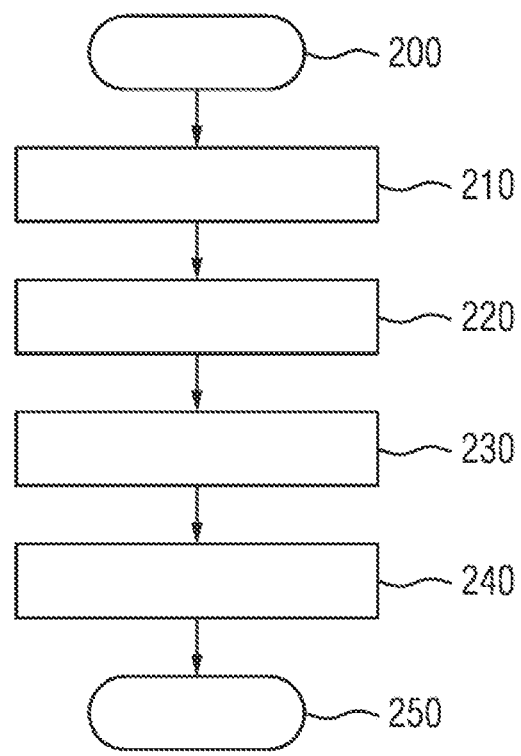
FIG. 9 shows an exemplary flowchart of a method for producing a fluid sensor apparatus incorporating teachings of the present disclosure.

FIG. 9 shows an exemplary flowchart for a method for producing a fluid sensor apparatus 100 incorporating teachings of the present disclosure. The method in FIG. 9 starts at step 200 and then proceeds to step 210 in which a printed circuit board 120 is provided.

In a subsequent step 220, at least one recess 130 is produced in the printed circuit board, which recess extends at least partially into the printed circuit board 120 in the direction of its thickness.

In the subsequent step 230, at least one ultrasonic transducer 110 is fitted to the printed circuit board 120 in such a way that the ultrasonic transducer 110 extends at least partially over the recess 130.

In a further step 240, the printed circuit board 120 together with the ultrasonic transducer 110 is encapsulated with plastic to form a housing 140 in such a way that this housing 140 is at least partially arranged in the recess 130, in particular the housing section 142 is arranged in the recess 130.

In some embodiments, step 230 comprises positioning the ultrasonic transducer 110 on the printed circuit board 120 in a predetermined position, fixing the ultrasonic transducer 210 at the predetermined position by means of a positioning device (not explicitly shown), and fastening and electrically connecting the ultrasonic transducer 110 to the printed circuit board 120 at the fastening areas 122, 124, 126 and 128 (see FIG. 2). The positioning device can at least partially prevent the ultrasonic transducer 110 from being displaced from its predetermined position during the soldering process, as a result of which the positioning accuracy of the ultrasonic transducer 110 on the printed circuit board 120 is at least partially improved. The ultrasonic transducer 110 can be fastened, for example, by means of soldering or adhesive bonding with electrically conductive adhesive.

The positioning device can be removed again before the housing 140 is formed. In some embodiments, the positioning device remains on the fluid sensor apparatus 100 and is also surrounded by the housing 140.

The teachings of the present disclosure may provide a defined connection of the ultrasonic transducer 110 to the printed circuit board is produced, with the risk of cavities occurring in otherwise provided full-surface soldering being at least partially reduced. Better damping of the decay behavior of the ultrasonic transducer 110 and less scattering of the properties in different, multiple fluid sensor apparatuses 100 can thus be achieved.

What is claimed is:

1. A fluid sensor apparatus for capturing a filling level and/or a quality of a fluid in a fluid container, the fluid sensor apparatus comprising:
    a printed circuit board extending along a plane and having a recess formed therein, the recess extending at least partially into the printed circuit board normal to the plane, and a fastening area adjacent the recess along the plane;
    an ultrasonic transducer fitted to the fastening area so the ultrasonic transducer extends at least partially across the recess along the plane; and
    a housing at least partially surrounding the printed circuit board so a portion of the housing extends into the recess;
    wherein the housing encapsulates the ultrasonic transducer against the printed circuit board.

2. The fluid sensor apparatus as claimed in claim 1, wherein the recess extends completely through the printed circuit board.

3. The fluid sensor apparatus as claimed in claim 2, wherein:
    the portion of the housing has a concave section on a first side facing away from the ultrasonic transducer;
    the concave section at least partially deflects the ultrasonic signals emitted by the ultrasonic transducer away from the ultrasonic transducer, or reflects them back to the ultrasonic transducer, or transmits them into the environment.

4. The fluid sensor apparatus as claimed in claim 1, wherein the recess includes a bore.

5. The fluid sensor apparatus as claimed in claim 4, wherein:
    the recess includes four bores with parallel bore axes;
    the bore axes of three of the bores are arranged relative to the bore axis of the fourth bore so they are at the corners of a triangle in a plane perpendicular to the bore axes; and
    the bores at least partially overlap.

6. The fluid sensor apparatus as claimed in claim 5, wherein:
    the four bores each have the same bore diameter; and
    the distance between the bore axes of three bores and the bore axis of the central bore corresponds to approximately 0.2 to 0.9 times the bore diameter.

7. The fluid sensor apparatus as claimed in claim 4, wherein:
    the recess includes five bores with parallel bore axes;
    the bore axes of four of the bores are arranged symmetrically relative to the bore axis of the fifth bore so they are at four respective corners of a quadrilateral in a plane perpendicular to the bore axes; and
    the bores at least partially overlap.

8. The fluid sensor apparatus as claimed in claim 7, wherein:
    the five bores each have the same bore diameter; and
    a distance between the bore axes of the four bores and the bore axis of the fifth bore corresponds to approximately 0.2 to 0.9 times the bore diameter.

9. The fluid sensor apparatus as claimed in claim 1, wherein the recess is at least partially formed by milling.

10. The fluid sensor apparatus as claimed in claim 9, wherein the recess is formed by three straight millings extending symmetrically to each other from a common point at an angle of approximately 120°.

11. The fluid sensor apparatus as claimed in claim 9, wherein the recess is a cruciform recess.

12. A method for producing a fluid sensor apparatus to capture a filling level and/or a quality of a fluid in a fluid container, the method comprising:
    providing a printed circuit board extending along a plane;
    producing a recess in the printed circuit board, the recess extending at least partially into the printed circuit board normal to the plane;
    fitting an ultrasonic transducer to a fastening area of the printed circuit board adjacent the recess along the plane so the ultrasonic transducer extends at least partially over the recess; and
    encapsulating the printed circuit board and the ultrasonic transducer with plastic to form a housing encapsulating the ultrasonic transducer against the printed circuit board and extending at least partially into the recess.

13. The method as claimed in claim 12, wherein the recess extends completely through the printed circuit board.

14. The method as claimed in claim 12, wherein producing the recess includes boring and/or milling.

15. The method as claimed in claim 12, wherein fitting the ultrasonic transducer to the printed circuit board comprises:
    positioning the ultrasonic transducer on the printed circuit board at a predetermined position;
    fixing the ultrasonic transducer at the predetermined position using a positioning device; and
    fastening and electrically connecting the ultrasonic transducer to the printed circuit board.

* * * * *